Feb. 13, 1945.  H. E. KALLMANN  2,369,572
BOOK
Filed Dec. 20, 1943
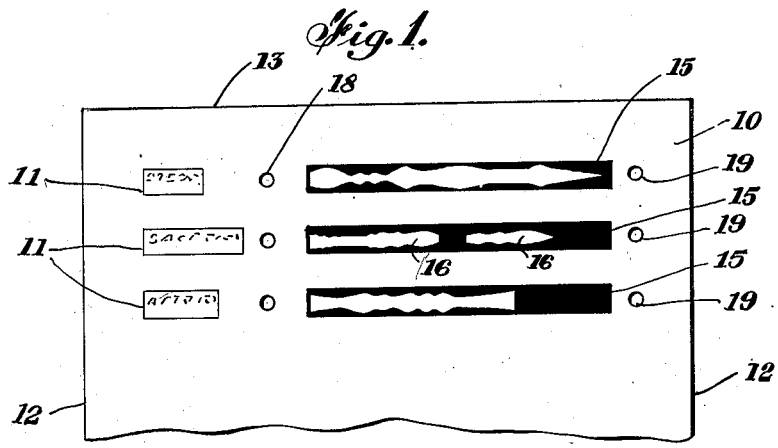
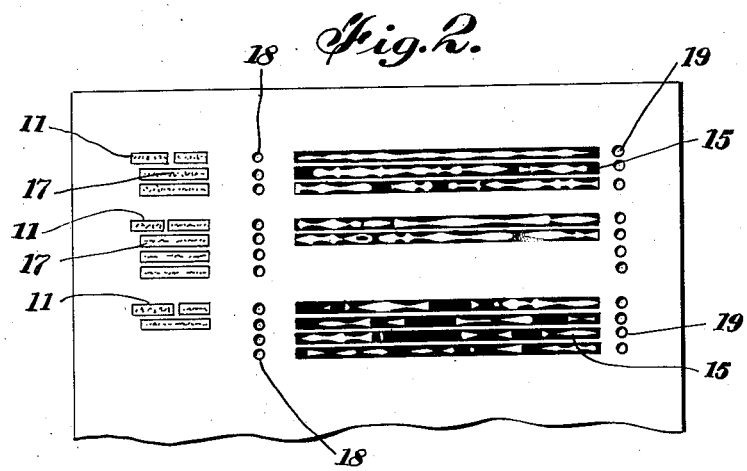
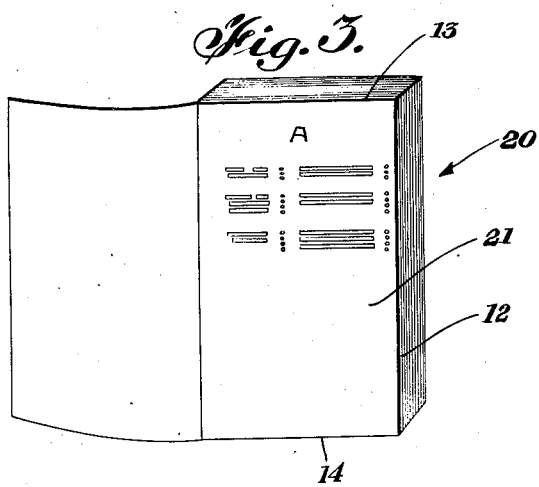
INVENTOR:
HEINZ E. KALLMANN
BY Patented Feb. 13, 1945

2,369,572

UNITED STATES PATENT OFFICE 2,369,572

BOOK

Heinz E. Kallmann, Boston, Mass.

Application December 20, 1943, Serial No. 515,041

4 Claims. (Cl. 35—35)

My present invention relates to printed matter, and more particularly to printed matter of the dictionary type.

It is an object of my present invention to enable simultaneous reading of printed matter and hearing of sound related and corresponding to the matter read.

It is a further object of my present invention to enable reading of certain words and hearing them pronounced correctly at the same time.

A further object of my present invention consists in a new type of dictionary offering visual and audible representation of the items listed.

Still a further object of my present invention consists in combining printed readable matter with printed audibly reproducible sound tracks in an entirely new and particularly advantageous way.

Another object of my present invention consists in books containing not only readable printed matter but also audibly reproducible sound records.

Still another object of my present invention consists in arranging printed matter, particularly single words or relatively short groups thereof, and corresponding sound tracks in an entirely new way, simplifying finding of the related words and sound tracks. The term "sound track" as used above and in the following description and claims is intended to define a sequence of consecutive sound records of whatever type, such as for instance used in talking pictures.

With the above objects in view, my present invention mainly consists of a printed matter composed of a series of printed readable records and a series of printed sound records, each of which relates and corresponds to one of said readable records. More particularly, the printed matter composed in accordance with my present invention contains a series of readable records printed in one column and a series of sound tracks, each of which relates and corresponds to one of these readable records, printed adjacent thereto in another column.

In accordance with a preferred embodiment of my present invention, the readable records are printed words or relatively short groups thereof, as for instance words listed in a dictionary. In this case, the corresponding sound tracks are preferably composed of sound records giving an audible definition of these words or an audible reproduction of these words as spoken, thereby teaching the pronunciation of these words. I wish, however, to stress that although I mention above as preferred embodiment, dictionary-like printed readable matter and sound records giving definition or pronounciation of the words listed in the dictionary, I do not intend to be limited to printed matter of this type; the term "dictionary" as used above and in the following description and claims is intended to comprehend every possible type of listing of words or short groups thereof mainly concerned with their definition or translation or pronunciation; the listings do not necessarily have to be alphabetic but the words may also be otherwise listed e. g. by groups of related objects. The term "readable records" as used above and in the following description and claims is intended to comprehend every type of readable matter, regardless of the fact of what type of readable symbols the same might be composed. Thus, such readable records may contain or consist of letters of the alphabet, figures, musical notes, shorthand or code symbols, or the like. Similarly, the terms "sound records" or "sound track" as used above and in the following description and claims are intended to comprehend audibly reproducible records of sounds of every possible type, as for instance words, music, noises or sounds of every description caused by any possible source, if and insofar these sounds relate to the corresponding readable records.

The novel features which I consider characteristic of my invention are set forth in particular in the appended claims. The invention itself, however, both as to its construction and its method of operation, together with additional objects and advantages thereof, will be best understood from the following description of specific embodiments, when read in connection with the accompanying drawing in which:

Figure 1 illustrates a page from a dictionary containing readable words and audibly reproducible sound records of these words;

Figure 2 illustrates a modification of the dictionary page shown in Figure 1 comprising also readable definitions and other comments to the words listed in the dictionary; and Figure 3 is a perspective view of a dictionary of the new type proposed by me.

As shown in Figure 1, the dictionary page 10 contains on its left side the words 11 printed in a vertical column parallel to edge 12 which extends from the top 13 to the bottom 14 of page 10.

The sound records 15, preferably of the variable area type, are shown printed horizontally adjacent to the corresponding words 11, normal to edge 12 of page 10. As shown in the drawing, each word 11 and corresponding sound track 15 is printed in the same line.

These sound records might contain, as explained above, definitions or pronunciation of the printed words 11. In the latter case, which is the preferred one, these sound records 15 are sound tracks for spoken reproduction of the printed words 11. Thus, actually the readable records 11 and the sound records 15 constitute different reproductions of the same words: while records 11 enable reading, i. e. visual perception of certain words, the corresponding sound tracks 15 enable hearing, i. e. audible perception, of the same words as spoken. Of course, it is possible to compose one or more of the sound tracks of two or more parts 16 as shown in Figure 1, and to give two or more alternatives of pronunciation of the same word.

I wish to state that my present invention is well suited for studying foreign languages, particularly if these use printed characters different from those familiar to the student. In such cases the sound records 15 do not contain the same words as those printed in the neighboring column but each of the printed readable words 11 is combined with a sound track 15 giving an audible translation in the language to be studied.

As shown in Figure 2, my new dictionary might also be composed in such a way that it contains printed definitions and comments 17 to the listed words in addition to the printed readable words 11 and the corresponding sound tracks 15. These definitions are preferably placed adjacent to the printed words 11. The corresponding sound tracks may consist, as shown in Figure 2, of several lines which might contain not only pronunciation but also translation or synonyms of the listed words or other sounds related to them.

The sound tracks shown in Figures 1 and 2 are retranslated into sound by a sound head of suitable shape not forming part of the present invention and therefore neither described in detail nor shown in the drawing. In order to secure proper alignment of this sound head with the sound track, it might be provided with means guiding it along edge 12 of the page or the page might be provided with perforations 18, 19 at the ends of sound tracks 15 for exact locating of the sound head when pins provided thereon are placed into these perforations.

Figure 3 is a perspective view of a complete dictionary 20 composed in accordance with my present invention. The first page 21 of this dictionary is composed in exactly the same way as the dictionary page shown in Figure 2 and therefore this dictionary 20 need not be further described or explained in detail. I wish however to state that such books may be of any conventional size and shape, printed on paper or other suitable material, as is any other illustrated book.

It will be understood that each of the elements described above, or two or more together, may also find a useful application in other types of printed matter differing from the types described above.

While I have illustrated and described the invention as embodied in dictionaries, I do not intend to be limited to the details shown, since various modifications and changes may be made without departing in any way from the spirit of my invention.

Without further anlysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehened within the meaning and range of equivalence of the following claims.

What I claim as new and desire to secure by Letters Patent is:

1. A book composed of a series of readable records printed in one column, a series of sound tracks each related and corresponding to one of said readable records and being printed, in a column, horizontally adjacent to the corresponding readable record, and separate means combined with each of said sound tracks for mechanically locating a sound head over said sound track so as to enable the same to correctly reproduce the sounds recorded on said sound track, if and when required.

2. A sheet of paper comprising printed matter composed of a series of words or relatively short groups thereof printed in a column, a series of sound tracks each related and corresponding to one of said printed words or groups thereof and being printed horizontally adjacent to the corresponding printed word or word group, and separate locating holes in said paper sheet adjacent to each of said sound tracks for mechanically locating a sound head over said sound track so as to enable the same to correctly reproduce the sounds recorded on said sound track, if and when required.

3. In a dictionary, a series of alphabetically listed words printed in a vertical row, a series of horizontally arranged audibly reproducible sound tracks of said words as spoken, each of said horizontal sound tracks being printed horizontally adjacent to the corresponding word, and separate locating means adjacent to both ends of each of said horizontal sound tracks for mechanically correctly locating the sound head over said sound track so as to enable the same to properly reproduce the sounds recorded on said sound track, if and when required.

4. A dictionary having a rectangular shape and being composed of paper leaves having each two pages, a plurality of said pages being provided with a series of alphabetically listed words printed in a column parallel to one of the vertical edges of said page, a series of horizontal sound tracks of said words printed each adjacent to the corresponding printed word normal to one of said vertical edges of said page, and separate locating holes in said paper leaves adjacent to both ends of each of said horizontal sound tracks for mechanically correctly locating the sound head over said sound track so as to enable the same to properly reproduce the sounds recorded on said sound track, if and when required.

HEINZ E. KALLMANN.